United States Patent
Wang

(10) Patent No.: US 11,910,224 B2
(45) Date of Patent: Feb. 20, 2024

(54) RECEIVER-CENTRIC COMMUNICATION BY COMBINED NETWORK TECHNOLOGIES FOR ENHANCED RELIABILITY

(71) Applicant: SIGNIFY HOLDING B.V., Eindhoven (NL)

(72) Inventor: Xiangyu Wang, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 333 days.

(21) Appl. No.: 17/437,456

(22) PCT Filed: Mar. 4, 2020

(86) PCT No.: PCT/EP2020/055645
§ 371 (c)(1),
(2) Date: Sep. 9, 2021

(87) PCT Pub. No.: WO2020/182562
PCT Pub. Date: Sep. 17, 2020

(65) Prior Publication Data
US 2022/0174460 A1    Jun. 2, 2022

(30) Foreign Application Priority Data
Mar. 14, 2019    (EP) ..................... 19162813

(51) Int. Cl.
*G16Y 10/75*        (2020.01)
*G16Y 20/30*        (2020.01)
(Continued)

(52) U.S. Cl.
CPC ............ *H04W 28/021* (2013.01); *H04L 67/12* (2013.01); *H04L 69/26* (2013.01); *H04W 4/80* (2018.02);
(Continued)

(58) Field of Classification Search
CPC ....... G16Y 10/70–80; G16Y 20/10–40; G16Y 30/00–10; G16Y 40/10–60;
(Continued)

(56) References Cited

U.S. PATENT DOCUMENTS 9,860,684 B2    1/2018    Jin et al.
9,894,512 B2    2/2018    Raghu et al.

FOREIGN PATENT DOCUMENTS

CN    101471704 B    3/2013
EP    3255949 A1    12/2017
WO    2018228883 A1    12/2018

OTHER PUBLICATIONS

A. Bachir, et al., "MAC Essentials for Wireless Sensor Networks", IEEE Communications Surveys & Tutorials, vol. 12, No. 2, Second Quarter 2010, Apr. 1, 2010, pp. 222-248.

*Primary Examiner* — Timothy J Weidner

(57) ABSTRACT

The present invention relates to a receiver-centric transmission system for IoT systems, such as lighting networks, with combo protocol radio chips that share a single radio front-end for two or more transmission protocols of different network technologies while preventing unacceptable performance degradations in one or both protocol modes. The receiver-centric approach allows implementation of two networks with acceptable performances on one single radio chip per node rather than requiring two radio chips per node.

15 Claims, 2 Drawing Sheets

(51) Int. Cl.
*G16Y 30/00* (2020.01)
*G16Y 40/40* (2020.01)
*H04L 67/12* (2022.01)
*H04L 69/00* (2022.01)
*H04W 4/80* (2018.01)
*H04W 8/22* (2009.01)
*H04W 16/04* (2009.01)
*H04W 24/02* (2009.01)
*H04W 28/02* (2009.01)
*H04W 40/24* (2009.01)
*H04W 48/06* (2009.01)
*H04W 52/02* (2009.01)
*H04W 72/12* (2023.01)
*H04W 74/08* (2009.01)
*H04W 76/15* (2018.01)
*H04W 84/18* (2009.01)
*H04W 88/06* (2009.01)
*H04W 92/02* (2009.01)
*H04W 92/18* (2009.01)

(52) U.S. Cl.
CPC .............. *H04W 8/22* (2013.01); *H04W 16/04* (2013.01); *H04W 24/02* (2013.01); *H04W 40/248* (2013.01); *H04W 48/06* (2013.01); *H04W 52/0212* (2013.01); *H04W 72/1215* (2013.01); *H04W 74/085* (2013.01); *H04W 76/15* (2018.02); *G16Y 10/75* (2020.01); *G16Y 20/30* (2020.01); *G16Y 30/00* (2020.01); *G16Y 40/40* (2020.01); *H04W 84/18* (2013.01); *H04W 88/06* (2013.01); *H04W 92/02* (2013.01); *H04W 92/18* (2013.01); *Y02D 30/70* (2020.08)

(58) Field of Classification Search
CPC ... H04L 12/2803–2838; H04L 2012/284–285; H04L 67/104–125; H04L 69/24–28; H04W 4/30–80; H04W 8/18–245; H04W 16/02–16; H04W 24/02–10; H04W 28/02–26; H04W 40/005–38; H04W 48/02–20; H04W 52/02–0296; H04W 56/001–0025; H04W 72/02–569; H04W 74/002–0891; H04W 76/10–50; H04W 84/005–22; H04W 88/005–188; H04W 92/02–24; Y02D 30/70
See application file for complete search history.

RECEIVER-CENTRIC COMMUNICATION BY COMBINED NETWORK TECHNOLOGIES FOR ENHANCED RELIABILITY

CROSS-REFERENCE TO PRIOR APPLICATIONS

This application is the U.S. National Phase application under 35 U.S.C. § 371 of International Application No. PCT/EP2020/055645, filed on Mar. 4, 2020, which claims the benefit of European Patent Application No. 19162813.0, filed on Mar. 14, 2019. These applications are hereby incorporated by reference herein.

FIELD OF THE INVENTION

The invention relates to the field of communication of network devices in multi-hop mesh-type networks, such as—but not limited to—Zigbee networks, for use in various different Internet of Things (IoT) applications for home, office, retail, hospitality and industry.

BACKGROUND OF THE INVENTION

Zigbee networks represent another type of a low-power/low-cost wireless networks, which allow multi-hop communication among devices in a mesh topology. Zigbee devices offer reduced power consumption and cost, together with mesh networking capability, which make them suitable for use in large-scale deployments. Examples of application of Zigbee mesh networks include home automation, building automation, retail services, smart energy, and wireless indoor lighting systems.

More specifically, Zigbee is an IEEE 802.15.4-based specification for a suite of high-level communication protocols used to create personal area networks with small, low-power digital radios. Major benefit of the Zigbee technology is its vertical integration, i.e. availability of a complete standardized protocol stack from IEEE 802.15.4 for the lower layers to network layer to application layer specification; as opposed to other wireless network technologies, such as Thread, Bluetooth or Wi-Fi. Zigbee networks are widely used in different applications, such as home, retail, and industry/office. Applications include wireless light switches, lamps, thermostats, various sensors, electrical meters with in-home displays, traffic management systems, and other consumer and industrial equipment that requires short-range low-rate wireless data transfer. Its low power consumption limits transmission distances to 10-100 m line-of-sight, depending on power output and environmental characteristics. Zigbee devices can transmit data over long distances by passing data through a mesh network of intermediate devices.

The so-called Zigbee Light Link (ZLL) standard is a low-power mesh network standard used by connected lighting systems. The ZLL stack consists of four layers: physical (PHY), medium access control (MAC), network (NWK), and application (APL). The two lower layers, PHY and MAC, are defined in the IEEE 802.15.4-2003 specification. During initial setup, a ZLL device performs a commissioning procedure to obtain the network key. Commissioning is a process in which a new ZLL network is set up or a new ZLL device is added to an existing network.

Recent advances in integrated circuit design have made it possible to combine Bluetooth Low Energy (BLE) and Zigbee technology on a single radio chip, allowing a low-power/low-cost device to operate as part of both a BLE network and a Zigbee network at the same time, leveraging a single wireless radio module. This may be achieved by fast switching the BLE and Zigbee device operations over time such that the device remains connected and operates in both networks simultaneously. The possibility of having a constrained device operating simultaneously on a BLE and a Zigbee networks (or any other combination of single-hop and multi-hop networks) opens up new solutions to improve the limitations of these existing technologies. BLE is a low-power/low-cost wireless network technology enabling single-hop communication in a star topology between a master node and a limited number of power-constrained slave nodes. BLE provides energy-efficient connectivity between power-constrained slave devices and a less power-constrained master device. An example of a BLE network may consist of a mobile telephone device as master, which can provide Internet connectivity to an ecosystem of resource constrained devices such as sensors, wearables, and building automation devices.

The availability of so-called combo radio chips (e.g. Zigbee/BLE, BLE/Wi-Fi or other combinations of multi-hop and single-hop protocols), where there are two wireless protocol stacks sharing one radio front-end in the time domain, makes new features possible for IoT systems, such as IoT lighting systems. The new features include direct control of node functions (e.g. wireless lighting) via single-hop (e.g. BLE) connections from a mobile, positioning of mobile phones via single-hop (e.g. BLE) signals sent from wireless IoT systems, and asset tracking via mobile single-hop (e.g. BLE) tags, whose signals are received by IoT systems (e.g. overhead wireless lighting networks).

An example of an application making use of radio chips that can combine BLE and Zigbee is disclosed in WO2018/228883 A1, which discloses a system and method to extend the coverage of a wireless single-hop network (e.g. BLE network) by relaying messages of the wireless single-hop network on a wireless multi-hop network (e.g. ZigBee mesh network), benefitting from a combined single-hop/multi-hop (e.g. BLE/ZigBee) capability of wireless combo devices which can seamlessly bridge between the two wireless networks.

While there are clear benefits of combo radio chips in IoT systems, there is also one common constraint that system designs must deal with while balancing between the performance of classic lighting control and the performance of added new features. The common constraint stems from the fact that, while there are two radio protocol stacks, there is only one radio front-end that has to be shared between the two radio protocol stacks. This may lead to significant performance degradation for at least one radio protocol if not managed well.

In the exemplary case of Zigbee broadcasts for lighting control in a Zigbee based lighting system, a BLE/Zigbee radio scheduler is inserted between the MAC and PHY protocol layers. This scheduler is used for scheduling the sharing of the radio hardware by the Zigbee and BLE stacks, typically in a duty cycle manner. However, if the duty cycle ratio of the BLE operation is denoted as d, the radio will be operating in the BLE mode for a portion d of the total time, while the Zigbee mode can only use a portion (1-d) of the total time. At the receiver side, if a Zigbee packet arrives during the BLE mode of the receiver, it will get lost unconditionally. Therefore, an additional loss due to the combo operation duty cycle is now present in the system. Apparently, the larger d is, the more degradation for Zigbee reception becomes.

Losses can be corrected if there is a possibility for re-transmissions. Indeed, in Zigbee broadcasts, neighbouring router nodes will help re-transmit the messages. Unfortunately, the packet loss rate does not improve in the same way when duty cycle ratios are different. While a small duty cycle ratio can be correct quickly by subsequent transmissions, the improvement is much slower when the duty cycle ratio is large (and hence packet loss ratio for one transmission is large), since the correction is proportional to (1-d) for each transmission.

For some applications, like asset tracking, all nodes or most of the nodes need to listen to incoming single-hop broadcast signals (e.g. BLE signals) from single-hop tags (e.g. BLE tags). This means a large d, i.e. a large duty cycle ratio of single-hop (e.g. BLE) mode, is desired for those nodes. Conversely, this also means multi-hop (e.g. Zigbee) broadcast performance will degrade more as re-transmissions become less effective. Exemplary measurements for combined BLE/Zigbee modes have shown that, if the BLE duty cycle ratio is 10%, which means 10% packet loss for Zigbee transmission, it will need only one further transmission to bring down the final packet loss ratio to 1% and the total attempts is 1.1 if the second attempt is conducted for only those that failed the first attempt (10% failure at the first attempt). However, if the BLE duty cycle ratio is 70% and as a result Zigbee packet loss is also 70%, it will take 14 attempts in total and 3.31 of the total loads to reach the same final loss ratio of 1.0%.

Consequently, while combo radio chips bring the benefit of new features, the performance has to be balanced between classic node control (e.g. lighting control) and added new features. As seen from the above exemplary measurements, the added BLE mode will inevitably introduce performance degradation of Zigbee transmissions. And while there are measures like re-transmissions that help repair the degradation, it has an associated cost in terms of increased traffic load or increased delays which grows non-linearly with the increasing BLE mode duty cycle ratios.

SUMMARY OF THE INVENTION

It is an object of the present invention to provide enhanced reliability for combo radio chips with combined network technologies sharing one radio front-end.

This object is achieved by by a network node as claimed in claim 1, by a lighting system as claimed in claim 10, by a method as claimed in claim 14, and by a computer program product as claimed in claim 15.

Accordingly, a preferred (e.g. mostly used) communication mode of a network technology of a destination or next-hop node of an intended transmission is determined and one of first and second communication modes of first and second network technologies (e.g. BLE and Zigbee or other combinations of network technologies) of the transmitting network node is selected for the transmission by its single radio chip to the destination node based on the determined preferred communication mode of the destination node. Thereby, a receiver-centric transmission approach is proposed in order to prevent unacceptable performance degradations in one or both communication modes. The receiver-centric approach allows implementation of two networks with acceptable performances on one single radio chip per node rather than requiring two radio chips per node. The nodes in the network may have capabilities to transmit and receive using both network technologies in a time-multiplexed manner with a certain duty cycle, while the network technologies may be incompatible with each other. The time share of the network technologies may not be even, so that the preferred communication mode of the destination node may be the communication mode with the highest percentage of airtime.

It is noted that the proposed solution is not limited to two communication modes and can be extended to three or more communication modes.

According to a first option, the network node may be configured as an end device of the second technology which operates as a device of the first network technology with a larger duty cycle ratio of the first communication mode. Thereby, an increased reception reliability of messages or advisements of the first communication mode can be achieved while still allowing communication in the second communication mode.

According to a second option which can be combined with the first option, the second communication mode may be selected (e.g. by the selection unit) for transmission to a parent node or next-hop node, if it is determines (e.g. by the determination unit) that a gateway device of the network is used as destination node of the transmission. As the gateway device is set in the second communication mode for most of the time, a reliable receipt of the transmission can be achieved.

According to a third option which can be combined with the first or second option, the second communication mode may be selected (e.g. by the selection unit) for a broadcast transmission to a parent node, if it is determined (e.g. by the determination unit) that all network nodes of the network are destination nodes of the transmission. Thereby, it can be assured that the broadcast message will reliably be received by all nodes, assuming that all nodes are capable of receiving the second communication mode at least temporarily.

According to a fourth option which can be combined with any one of the first to third options, the network node may be configured as an end device or router device of the first network technology, which is operated with a larger duty cycle ratio of the first communication mode, or as an end device or router device of the second network technology, which is operated with a larger duty cycle ratio of the second communication mode. Thereby, flexible use of both communication modes can be achieved, since the network nodes do not need to use a particular communication mode all the time.

According to a fifth option which can be combined with any one of the first to fourth options, the preferred communication mode of the destination or next-hop node may be determined (e.g. by the determination unit) via an out-of-band mechanism (e.g. by a communication with the destination node outside the transmission band of the first and second network technology), wherein the selection unit may be configured to select the determined preferred communication mode for the transmission to the destination or next-hop node. This measure ensures that the preferred communication mode of the target node can reliably be determined.

According to a sixth option which can be combined with any one of the first to fifth options, the preferred communication mode of the destination or next-hop node may be determined (e.g. by the determination unit) based on an application on which the network node is operating for the transmission, wherein the determined preferred communication mode is selected (e.g. by selection unit) for the transmission to the target node. Thereby, reliability of transmission can be enhanced by directly deriving the preferred communication mode of the target node from an application which is running at the transmitting network node during the transmission to the destination or next-hop node.

According to a seventh option which can be combined with any one of the first to sixth options, the first communication mode may be determined (e.g. by the determination unit) if the network node is operating on an application for a broadcast transmission. This measure ensures that broadcast transmissions are reliably received by all network nodes, assuming that all nodes listen to both communication modes.

According to an eighth option which can be combined with any one of the first to seventh options, the second communication mode may be determined (e.g. by the determination unit) if the network node is operating on an application for a unicast or many-to-one transmission. This measure ensures that unicast or many-to-one transmissions are reliably received by the destination or next-hop node, assuming that each node will adapt its used communication mode to the receiving node of the next hop.

According to a ninth option which can be combined with any one of the first to eighth options, both first and second communication modes are determined (e.g. by the determination unit) if the network node is operating on an application for a broadcast transmission. Thereby, the transmitting node ensures that all network nodes will receive the broadcast transmission and does not need to rely on other router devices.

According to a tenth option which can be combined with any one of the first to ninth options, the plurality of network nodes may comprise first network nodes configured as an end device of the second network technology and operated as a device of the first network technology with a larger duty cycle ratio of the first communication mode, and second network nodes configured as a router device of the second network technology and operated with a larger duty cycle ratio of the second communication mode, wherein the second network nodes may be configured to forward information of a received broadcast message of the second communication mode in an advertisement message of the first communication mode. Thereby, it can be ensured that the information of the broadcast message reaches all network nodes in a reliable manner.

According to an eleventh option which can be combined with any one of the first to tenth options, the plurality of network nodes may comprise first network nodes configured as a router device of the first network technology and operated with a larger duty cycle ratio of the first communication mode, and second network nodes configured as an end device or router device of the second network technology and operated with a larger duty cycle ratio of the second communication mode, wherein the first network nodes may be configured to forward a received broadcast message of the first communication mode in both first and second communication modes, and/or wherein the second network nodes may be configured to translate a received unicast message of the second communication mode to a message of the first communication protocol or to tunnel the received unicast message in a message of the first communication protocol, if the next-hop node is a first network node. Thereby, it can be ensured that the information of broadcast, unicast and many-to-one transmissions reaches the desired network nodes in a reliable manner.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

Moreover, it is noted that in recent years radio chips or chip modules have evolved, in which functionality is moved towards software. As a result, high-frequency functions (specifically on the physical protocol layer (PHY layer), e.g., the actual channel modulation) may still be implemented in hardware, while lower-frequency functionality is implemented in software (specifically on the Medium Access Control layer (MAC layer) and above). Due to this, certain hardware components of the PHY layer may be reused for different radio functionalities. Consequently, first and second communication units, which may be described as separate units in the following embodiments, may in practice be implemented in a single hardware component, e.g., based on different software routines. Thus, the two communication units may be implemented as so-called software radio's wherein radio functionality at and above the MAC layer may be mapped towards a software layer and wherein PHY layer functionality, which may e.g. include channel modulation, may still be primarily implemented in hardware. However, even when using a software radio device capable of operating in multiple-modes, when in use for the first communication mode (e.g. BLE radio), the device may still be configured to operate as a communication unit of the first network technology and when in use for the second communication mode (e.g. Zigbee radio) it may still be configured to operate as a communication unit of the second network technology.

It shall be understood that the network node of claim 1, the lighting system of claim 10, the method of claim 14 and the computer program product of claim 15 may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Embodiments of the present invention are now described based on a Zigbee network as an example of a first network technology (e.g. multi-hop technology) and a Bluetooth Low Energy (BLE) connection or network as an example of a second network technology (e.g. point-to-point connection based on single-hop technology).

More specifically, according to various embodiments, different reliability enhancing approaches are presented below for IoT networks that use combo radio chips to provide more than one functions.

In general, network nodes in the network are capable of sending or receiving or both on both network technologies, but not at the same time due to their single radio hardware (i.e. single RF front-end unit). The network nodes operate on different network technologies with very different duty cycles. As a result, there are network nodes that mainly operate (e.g. listen) on the first network technology, while other network nodes mainly operate (e.g. listen) on the second network technology.

In the following, a lighting IoT network is described as an exemplary embodiment where every node has one combo radio chip that is used for both classic lighting control function and asset tracking using BLE tags.

Figures 1, 2:
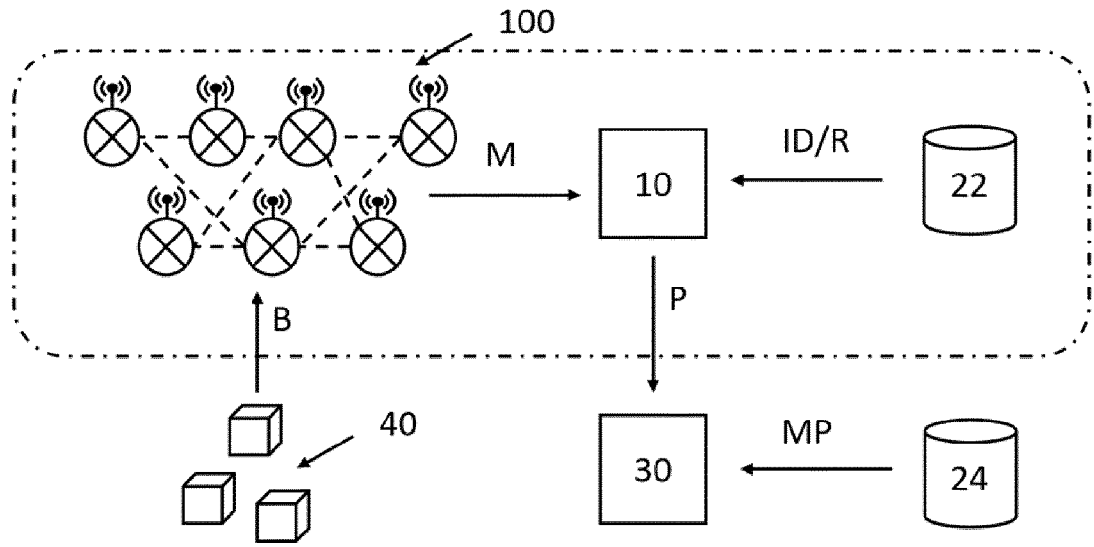
FIG. 1 schematically shows a schematic architecture of an asset tracking system which is based on a lighting system according to various embodiments.
FIG. 2 schematically shows an exemplary network architecture with combo network nodes according to various embodiments.

FIG. 1 schematically shows an architecture of an asset tracking system which is based on a lighting system according to various embodiments.

In general, asset tracking may refer to tracking of physical assets, either by scanning barcode labels attached to the assets or by using tags using e.g. Global Positioning System (GPS), BLE, infrared (IR) or radio frequency identification (RFID) transmitters which broadcast their location. These technologies can also be used for indoor tracking of persons or objects to which a tag is attached.

In FIG. 1, BLE tags 40 send BLE beacon signals B periodically which are being received by a lighting network 100 using its combo radio chip equipped nodes. Measurements M of the BLE beacons B are conducted and results are being sent by the combo radio chips through the lighting network to a positioning engine 10 using the Zigbee protocol. The positioning engine 10 queries a lighting location database 22 to obtain identifications (ID) and reference positions (R) of combo radio chips or respective luminaires from which measurements have been received. Based thereon, the positioning engine 10 determines position updates P and forwards them to location-based services (e.g. dashboards for information display) provided at user end devices 30. The tracked asset may then be displayed on a map MP retrieved from a map database 24.

The lighting network 100 consists of nodes with combo BLE/Zigbee radio chips. To make both lighting control and asset tracking feasible, a fixed set of nodes may be designated as Zigbee-only routers that operate only or mainly in Zigbee mode, while the rest of the nodes may operate in both Zigbee and BLE modes. A set of Zigbee-only routers may then maintain Zigbee operations. Those non-router nodes may be configured in mainly the BLE mode but may be in the Zigbee mode when it has something to send or receive. A reason why non-router nodes operate mainly in the BLE mode may be to facilitate the reception of BLE beacon signals from the BLE tags 40. The longer non-router nodes can operate in the BLE mode, the better the performance for the reception of BLE signals from the BLE tags 40 and hence the better for tag battery lifetime.

FIG. 2 shows an illustration of such an exemplary network configuration with an exemplary number of 100 nodes where bright nodes (nodes No. 5, 12, 19, 34, 37, 50, 51, 64, 67, 82, 89 and 96) are Zigbee-only router nodes, and where dark non-router nodes operate in mixed Zigbee/BLE modes. Non-router nodes have little problem to send as long as there are enough Zigbee-only router nodes nearby. However, a non-router node will have problems to receive if it operates mainly in the BLE mode and therefore it will lose a majority of Zigbee packets that are sent to him by Zigbee-only router nodes. Transmissions by surrounding router nodes may help to mitigate packet losses, although this can only be achieved when there are sufficient re-transmissions available.

According to various embodiments, a mixed mode of operations (i.e. network technologies) is provided for all network nodes but with an optimal sending and receiving strategy for each operating mode (i.e. network technology) that is present in the network. The strategy follows a receiver-centric principle in that when a node sends a message to another node or nodes, it sends in that mode (i.e. on that network technology) in which the receiving nodes operate the longest. This improves the receiving probability, particularly when there is an uneven duty cycle ratio between the two modes.

Referring to the example of FIG. 2, bright nodes are Zigbee routers that operate only or mostly in the Zigbee mode while dark nodes are Zigbee non-router nodes that operate mainly in the BLE mode. Zigbee router nodes need to be in the Zigbee mode most of the time since they need to constantly listen on Zigbee networks to maintain proper operations. Similarly, non-Zigbee-router nodes need to be mostly in the BLE mode to constantly listen to incoming BLE signals from the tags 40. Therefore, it is proposed to send any packets to them in the mode in which they operate the most. Conversely, if packets are sent to them in the mode in which they operate the least, this will result in huge packet losses, as discussed before.

Figure 3:
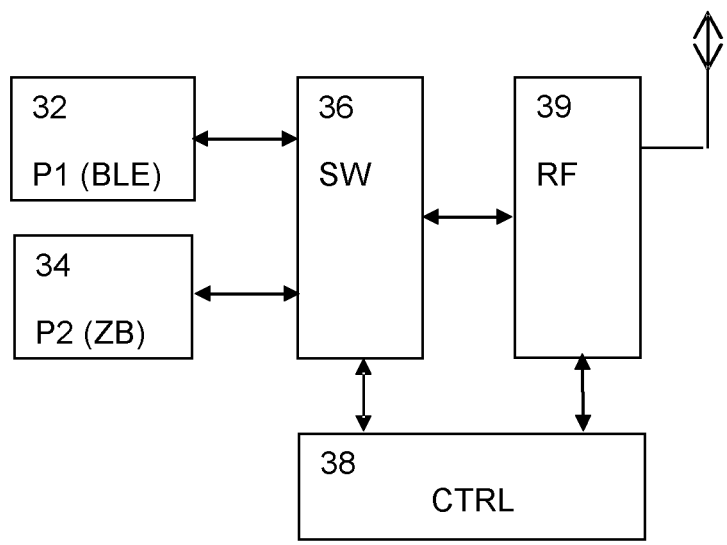
FIG. 3 schematically shows a block diagram of a combo network node according to various embodiments.

FIG. 3 schematically shows a block diagram of a network node with a combo radio chip, such as the bright and dark nodes of FIG. 2.

A first protocol unit 32 (P1) provides protocol functions of the first network technology (e.g. BLE) to a single shared RF front end unit 39 for transmitting and receiving wireless signals via a transmitting and receiving antenna. Furthermore, a second protocol unit 34 (P2) provides protocol functions of the second network technology (e.g. Zigbee) to the shared RF front end (RF) 39 for transmitting and receiving wireless signals via the transmitting and receiving antenna. A switching unit (SW) 36 switches between the first protocol unit 32 and the second protocol unit 34 to provide the correct messages/signalling of a selected network technology to the RF front end 39 based on a control signal received from a control unit (CTRL) 38. The control unit 38 may also directly transmit and receive information via the RF front end 39, e.g. via out-of-band signalling.

In a simple case, duty cycles for the two network technologies may be configured when the network node starts to operate or joins the network by commissioning.

When the network node of FIG. 3 is sending (i.e. as a source node) or relaying further (i.e. as a router or relaying node), the control unit 38 may determine (i.e. select) based on retrieved information about the destination/target node(s) the network technology to be used for a transmission to the destination/target node.

As explained in the following example embodiments, the decision about which network technology to use for transmission may be based on some (e.g. pre-configured) rules with input of application modes (unicast, broadcast, etc.), network addresses used, and the like. The retrieved information may thus relate to at least one of a transmission application (e.g. unicast, broadcast, multicast etc.), a preferred network technology on which the destination/target node is mainly operating, destination address formats or values, and application message types. E.g., in the case of a unicast application, the control unit 38 may choose one single network technology to forward, i.e., the network technology the destination/target node is mostly operating on. Or, in the case of a broadcast and/or multicast application, the control unit 38 may choose to send on only one network technology or both network technologies, in order to reach network nodes that operate mainly on either one of the two network technologies. In a first structure, the dark nodes in FIG. 2 are Zigbee end devices and operate as a BLE device but with large BLE duty cycle ratios. Dark nodes do not have a network among themselves, but they can receive tag beacon signals on e.g. three BLE advertisement channels. The bright nodes of FIG. 2 are Zigbee routers.

The retrieved information may for example originate from a central source or from the target node itself; in one embodiment a central source, such as a gateway may register for each node their respective preferred communication mode. This mode may be set during commissioning and/or dynamically set. In the latter case it may be easier to retrieve the preferred communication mode from the target node itself, directly or indirectly as is common within mesh networks, a node may for example cache the preferred mode of communication of its frequent communication partners, polling their frequent communication partners every now and then.

A centralized storage may be advantageous in systems where the preferred mode is static as then traffic from the central storage can be kept to a minimum. It also allows a centralized assignment, and management, allowing the centralized node to broadcast updates. As an alternative to the centralized storage, which is particularly beneficial in systems where the preferred mode may change more frequently, a more distributed approach may be selected where information is cached more locally, so as to avoid large amounts of traffic to a central gateway.

More alternatively the network may be used to run particular applications. Examples of such applications are for example a positioning application or a lighting application. When such applications are operated in a time-multiplexed manner, it may be beneficial to adapt the mode of communication to the then current application. A network node may adapt its operation based thereon and use a predetermined rule, or information on the preferred communication mode of its communication partners obtained directly or indirectly from that communication partner.

In an example embodiment of the first structure, a dark node intends to send a message (e.g. packet) via its network to a gateway that is also a Zigbee router. The choice for it is to send the packet to its parent node or next-hop node by using the Zigbee protocol. Once the message reaches the parent node or next-hop node, it can travel further in the Zigbee network maintained by the bright nodes according to the Zigbee routing protocols.

In another example embodiment, a dark node intends to send a message to all nodes in the network. It will send a broadcast message by using the Zigbee protocol to its parent node. Its parent node will then broadcast the message to other routers in the Zigbee protocol too. As other bright nodes are also Zigbee routers, they will be able to receive the message. For the other dark nodes in the network, the best approach to reach them is for the bright nodes to send to them in BLE advertisement messages which will be received at the dark nodes as they constantly listen on the advertisement channels. This however requires the bright nodes to send also in the BLE mode, which reduces their time spent on the Zigbee mode. This is acceptable as long as the network load for an individual node to send is low, which is typically the case since there are not so many lighting control messages over a day.

Furthermore, in a second structure, the dark nodes of FIG. 2 operate mainly in the BLE mode (either BLE routers or BLE end devices). Similarly, the bright nodes operate mainly in the Zigbee modes but also act as BLE end devices. These combinations of device modes are possible because both Zigbee end devices and BLE end devices do not need to listen on their channels all the time. They only need to be on their channels when they have something to send.

In an example embodiment of the second structure, one node, either dark or bright, intends to send a message to a remote dark or bright node. The application layer of its protocol stack (e.g. control unit 38 of FIG. 3) may then derive via out-of-band mechanisms what the most relevant mode of the remote target node is. The application layer on the sending node will then send the message to the protocol function that is the same for the remote receiving node. Since there are essentially two mesh networks with two sets of (non-overlapping) routers, the message will be received in either mesh network and get routed further to the target node.

In another example embodiment of the second structure, applications are pre-defined to use a certain protocol in the network. For example, lighting control messages are typically broadcast messages and are configured to use the BLE broadcast protocol while sensor data report messages are typically unicast messages and are configured to use the Zigbee unicast or many-to-one protocols.

For broadcast-related applications, a bright Zigbee router and BLE end device will send its message to dark BLE router devices. Once it reaches there, the BLE router devices should send in both the BLE protocol and the Zigbee protocol in order to reach all nodes in the network reliably.

For unicast-related applications, a dark BLE end device or router device will send in a Zigbee unicast message to a parent bright Zigbee router device. Once it reaches there, the message will get routed in Zigbee protocol. If the target node is a dark node, the last hop bright node will either translate the message to a BLE message or it should tunnel the Zigbee message in a BLE message in order to reach the destination reliably.

In a still further embodiment of the second structure, particularly for broadcast messages, the source node may decide or be configured to use both protocols. As such, instead of relying on other router devices, it may send out the same application message in both protocols and let the messages propagate in both networks. The number of routers for both modes may be configured to a minimum necessary level. Therefore, the broadcast network load on either mode may be controllable.

Figure 4:
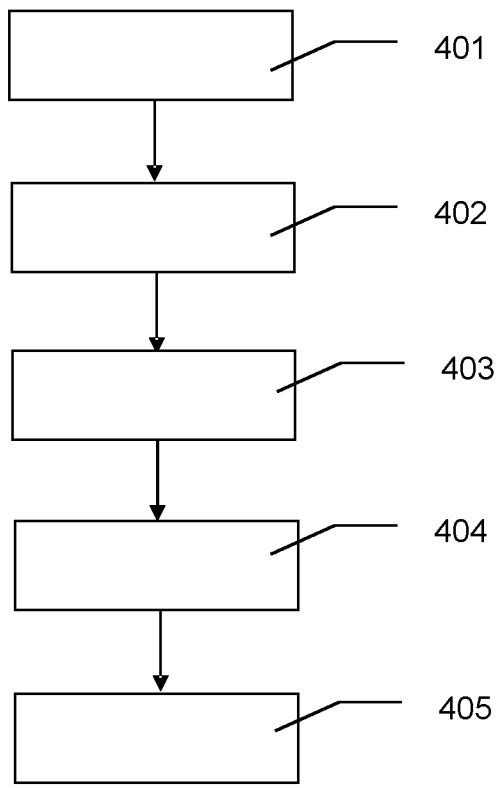
FIG. 4 shows a flow diagram of a receiver-centric transmission procedure according to various embodiments.

FIG. 4 shows a flow diagram of a transmission procedure for a combo radio chip for achieving enhanced reliability according to various embodiments.

In a first step S401, the intended target node for a message is determined (e.g. by the control unit 38 of FIG. 3). Then, in step S402, the underlying transmission-related application and/or the preferred network technology at the target node is determined (e.g. by the control unit 38 of FIG. 3). Based on the information obtained in step S402, a network technology for the transmission is selected in step S403 (e.g. by the switching unit 36 of FIG. 3). Thereafter, in step S404, the first receiving node (e.g. parent node or next-hop node), if any, is selected for an intended broadcast, unicast, multicast or many-to-one transmission. Finally, in step S405, the message is transmitted to the target node via the optional first receiving node to the target node by using the selected protocol mode.

As a result, a protocol of the selected network technology for use by the combo radio chip is selected according to the preferences at the target or receiving node. It is thus possible to enhance reliability while using combined radio devices with a RF single front end.

To summarize, a receiver-centric transmission system for IoT systems, such as lighting networks, with combo protocol radio chips that share a single radio front-end for two or more transmission protocols of different network technologies while preventing unacceptable performance degradations in one or both protocol modes has been described. The receiver-centric approach allows the implementation of two networks with acceptable performances on one single radio chip per node rather than requiring two radio chips per node.

While the invention has been illustrated and described in detail in the drawings and foregoing description, such illustration and description are to be considered illustrative or exemplary and not restrictive. The invention is not limited to the disclosed embodiments. The proposed reliability enhancing procedures can be applied to any possible combination of network technologies (e.g. single-hop and multi-hop network technologies). Moreover, the invention can be applied in any product that implements a multi-hop network (e.g. Zigbee or others) or other network technology interfacing with a single-hop network (e.g. BLE or others) or other network technology. An example includes a large-scale Zigbee lighting network where single light-points are commissioned using a mobile device such as smartphone or tablet via BLE. The present invention is equally applicable to any other combination of single-hop technology (e.g. BLE, Infrared (IR), wireless local area communication (Wi-Fi)) with multi-hop technology (e.g. Zigbee PRO, Thread, WirelessHART, SmartRF, CityTouch, IP500, and any other mesh or tree-based technology).

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations like those indicated in FIG. 4 can be implemented as program code means of a computer program and/or as dedicated hardware. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A network node for use in a network, the network node configured to transmit or receive either in a first communication mode using a first network technology or a second communication mode using a second network technology on a time-sharing basis according to a predetermined duty cycle, the network node comprising an apparatus for controlling transmission of a network node in a network, wherein the apparatus comprises:
   a determination unit for determining a preferred communication mode of a target node of the transmission, the preferred mode being a communication mode of the target node, out of the first and second communication mode, that the target node uses most; and
   a selecting unit for selecting one of the first and second communication modes for the transmission to the target node based on the determined preferred communication mode of the target node, wherein the preferred communication mode is based on information about the target node, which information is retrieved from the target node directly, indirectly from a further node or gateway, or may result from pre-configured rules.

2. The network node of claim 1, wherein the network node is configured as an end device of the second network technology which operates as a device of the first network technology with a larger duty cycle ratio of the first communication mode as compared to the respective duty cycle ratio of the other communication mode.

3. The network node claim 1, wherein the first network technology is a single-hop technology and the second network technology is a multi-hop technology.

4. The network node of claim 3, wherein the selection unit is configured to select the second communication mode for transmission to a parent node or next-hop node, if the determination unit determines a gateway device of the network as the target node of the transmission.

5. The network node of claim 3, wherein the selection unit is configured to select the second communication mode for a broadcast transmission to a parent node, if the determination unit determines all network nodes of the network as target nodes of the transmission.

6. The network node of claim 1, wherein the network node is configurable as either an end device or router device of the first network technology, which is operated with a larger duty cycle ratio of the first communication mode as compared to the respective duty cycle ratio of the other communication mode, or as either an end device or router device of the second network technology, which is operated with a larger duty cycle ratio of the second communication mode as compared to the respective duty cycle ratio of the other communication mode.

7. The network node of claim 6, wherein the determination unit is configured to determine the preferred communication mode of the target node via an out-of-band mechanism, and wherein the selection unit is configured to select the determined preferred communication mode for the transmission to the target node.

8. The network node of claim 6, wherein the determination unit is configured to determine the preferred communication mode of the target node based on an application that the network node is operating in for the transmission, and wherein the selection unit is configured to select the determined preferred communication mode for the transmission to the target node.

9. A lighting system comprising a plurality of network nodes as claimed in claim 1.

10. The lighting system of claim 9, wherein the first network technology is used for receiving beacon signals from tag devices of an asset tracking system.

11. The lighting system of claim 9, wherein the plurality of network nodes comprise first network nodes configured as end device of the second network technology and operated as a device of the first network technology with a larger duty cycle ratio of the first communication mode as compared to the respective duty cycle ratio of the other communication modes, and second network nodes configured as a router device of the second network technology and operated with a larger duty cycle ratio of the second communication mode, wherein the second network nodes are configured to forward information of a received broadcast message of the second communication mode in an advertisement message of the first communication mode.

12. The lighting system of claim 9, wherein the plurality of network nodes comprise first network nodes configured as a router device of the first network technology and operated with a larger duty cycle ratio of the first communication mode, and second network nodes configured as an end device or router device of the second network technology and operated with a larger duty cycle ratio of the second communication mode,
wherein the first network nodes are configured to forward a received broadcast message of the first communication mode in both first and second communication modes, or
wherein the second network nodes are configured to translate a received unicast message of the second communication mode to a message of the first communication mode or to tunnel the received unicast message in a message of the first communication mode, if the next-hop node is a first network node.

13. The network node of claim 1, wherein the preferred communication mode is based on information about the target node, which information is retrieved from the target node directly via an out-of-band mechanism or results from pre-configured rules.

14. A method of controlling transmission of a network node in a network, the network node being configured to transmit or receive in a first communication mode using a first network technology and in a second communication mode using a second network technology on a time sharing basis according to a predetermined duty cycle, wherein the method comprises:
  determining a preferred communication mode of a target node of the transmission, the preferred mode being a communication mode of the target node, out of the first and second communication mode, that the target node uses most; and
  selecting one of the first and second communication modes for the transmission to the target node based on the determined preferred communication mode of the target node,
  wherein the preferred communication mode is based on information about the target node, which information is retrieved from the target node directly, indirectly from a further node or gateway, or may result from pre-configured rules.

15. A non-transitory computer program product comprising code means for executing the steps of claim 14 when run on a network node.

* * * * *